United States Patent
Teboulle

(10) Patent No.: US 11,644,477 B2
(45) Date of Patent: May 9, 2023

(54) METHOD FOR MEASURING A SPEED OF A FLUID

(71) Applicant: SAGEMCOM ENERGY & TELECOM SAS, Rueil Malmaison (FR)

(72) Inventor: Henri Teboulle, Rueil Malmaison (FR)

(73) Assignee: SAGEMCOM ENERGY & TELECOM SAS, Rueil Malmaison (FR)

( * ) Notice: Subject to any disclaimer, the term of this patent is extended or adjusted under 35 U.S.C. 154(b) by 320 days.

(21) Appl. No.: 16/488,898

(22) PCT Filed: Feb. 22, 2018

(86) PCT No.: PCT/EP2018/054448
§ 371 (c)(1),
(2) Date: Aug. 26, 2019

(87) PCT Pub. No.: WO2018/162249
PCT Pub. Date: Sep. 13, 2018

(65) Prior Publication Data
US 2020/0174036 A1 Jun. 4, 2020

(30) Foreign Application Priority Data
Mar. 10, 2017 (FR) ...................................... 1751989

(51) Int. Cl.
*G01P 21/02* (2006.01)
*G01F 1/667* (2022.01)
(Continued)

(52) U.S. Cl.
CPC .............. *G01P 21/025* (2013.01); *G01F 1/66* (2013.01); *G01F 1/665* (2013.01); *G01F 1/666* (2013.01);
(Continued)

(58) Field of Classification Search
CPC .......... G01P 21/025; G01P 5/245; G01P 5/18; G01F 1/667; G01F 1/66; G01F 1/663; G01F 1/665; G01F 1/666; G01F 1/668
See application file for complete search history.

(56) References Cited

U.S. PATENT DOCUMENTS 4,616,510 A * 10/1986 Moore .................... G01F 1/667
73/861.27
5,117,698 A * 6/1992 Baumoel ................. G01F 1/667
73/861.28
(Continued)

FOREIGN PATENT DOCUMENTS

JP 2003302416 A * 10/2003
JP 2003302416 A 10/2003
(Continued)

*Primary Examiner* — Daniel S Larkin
*Assistant Examiner* — Fatemeh Esfandiari Nia
(74) *Attorney, Agent, or Firm* — Muncy, Geissler, Olds & Lowe, P.C.

(57) ABSTRACT

A method of measuring the speed of a fluid comprising the following steps:
  generating a plurality of pseudorandom frequencies (fus_n);
  for each pseudorandom frequency (fus_n), emitting ultrasound signals into the fluid to travel along a path of defined length;
  receiving the ultrasound signals;
  for each received ultrasound signal, producing a travel time measurement, so as to generate for each pseudorandom frequency (fus_n) a predefined number of travel time measurements;
  for each pseudorandom frequency (fus_n), evaluating the accuracy of the measurements;
  for evaluating the speed of the fluid, making use of the measurements produced for the pseudorandom frequency that presents the greatest accuracy.

26 Claims, 6 Drawing Sheets

(51) Int. Cl.
  *G01P 5/24* (2006.01)
  *G01F 1/66* (2022.01)
  *G01P 5/18* (2006.01)
  *G01P 5/00* (2006.01)
  *G01F 3/00* (2006.01)

(52) U.S. Cl.
  CPC ............... *G01F 1/667* (2013.01); *G01F 3/00* (2013.01); *G01P 5/00* (2013.01); *G01P 5/18* (2013.01); *G01P 5/245* (2013.01)

(56) References Cited

U.S. PATENT DOCUMENTS

| | | | | |
|---|---|---|---|---|
| 5,467,321 | A * | 11/1995 | Baumoel | G01F 1/667 73/861.27 |
| 2005/0180530 | A1* | 8/2005 | Reiche | G01S 7/527 375/317 |
| 2009/0010103 | A1* | 1/2009 | Sallas | G01V 1/005 367/41 |
| 2013/0041600 | A1* | 2/2013 | Rick | G01F 1/002 702/50 |
| 2015/0078129 | A1* | 3/2015 | Skoglund | G01S 15/02 367/87 |
| 2017/0082650 | A1* | 3/2017 | Hies | G01P 5/241 |
| 2017/0328865 | A1* | 11/2017 | Ao | B01D 17/12 |

FOREIGN PATENT DOCUMENTS

| | | | |
|---|---|---|---|
| JP | 2013246065 | A * | 12/2013 |
| JP | 2013246065 | A | 12/2013 |

* cited by examiner

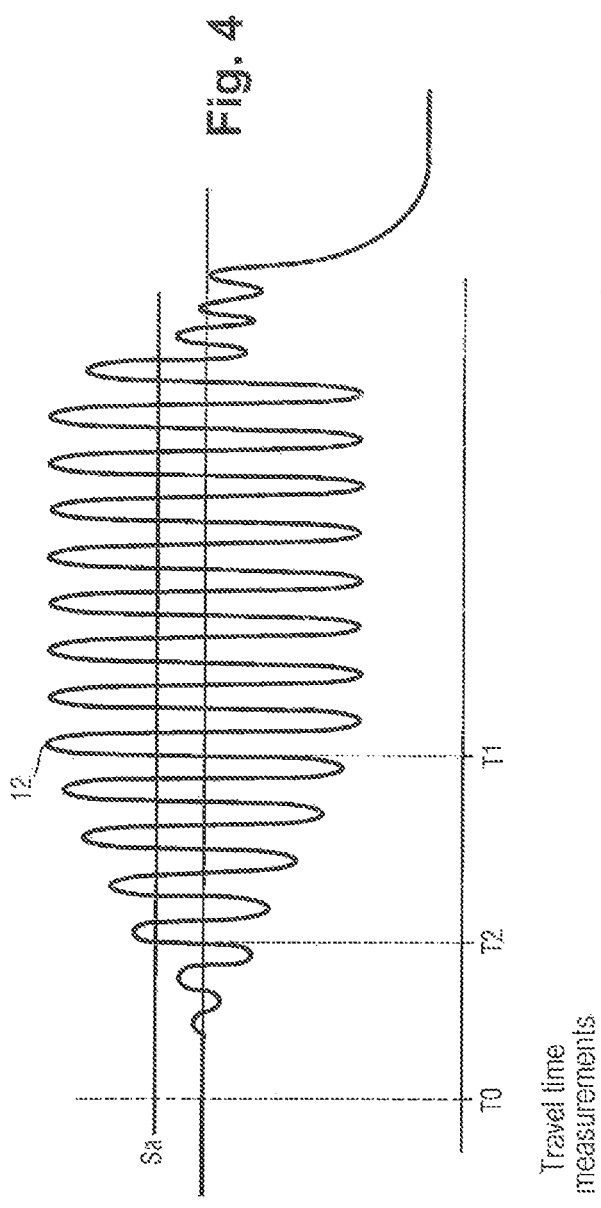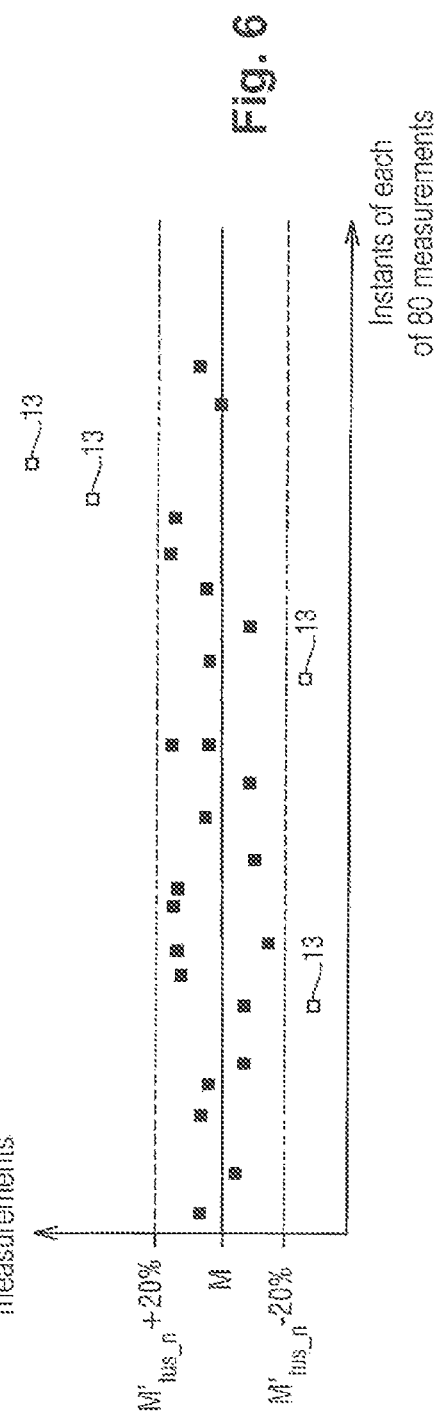

METHOD FOR MEASURING A SPEED OF A FLUID

The invention relates to the field of methods of measuring a fluid speed.

BACKGROUND OF THE INVENTION

In order to measure a flow rate of a fluid flowing in a pipe, an ultrasonic flow meter conventionally makes use of a device for measuring the speed of the fluid by emitting and receiving ultrasound measurement signals.

Such a measurement device comprises a duct connected to the pipe in which the fluid flows. In order to measure the speed of the fluid, an ultrasound measurement signal is emitted into the duct to follow a path of defined length, the travel times taken by the ultrasound measurement signal to travel along the path of defined length both from upstream to downstream and from downstream to upstream are measured, and the speed of the fluid is estimated on the basis in particular of the defined length and of the difference between the travel times.

For water meters, three main types of measurement device are in use.

A first type of measurement device 1, sometimes referred to as a "classical pipe" device, is shown in FIG. 1. The first type of measurement device 1 comprises a first transducer 2a, a second transducer 2b, and a measurement module 3 connected to the first transducer 2a and to the second transducer 2b.

The first transducer 2a and the second transducer 2b are paired. By way of example, the first transducer 2a and the second transducer 2b are piezoelectric transducers.

The path of defined length is thus a rectilinear path of length L between the first transducer 2a and the second transducer 2b.

The first transducer 2a emits an ultrasound measurement signal Se. By way of example, the ultrasound measurement signal is generated from a squarewave signal 4. The second transducer 2b receives an ultrasound signal Sr resulting from the ultrasound measurement signal Se propagating in the fluid.

The measurement module 3 thus estimates a travel time Tab taken by the ultrasound measurement signal Se to travel along the path of defined length from upstream to downstream.

Likewise, the second transducer 2b emits an ultrasound measurement signal that is received by the first transducer 2a. The measurement module 3 thus estimates a travel time Tba taken by the ultrasound measurement signal to travel along the path of defined length from downstream to upstream.

The measurement module 3 then calculates the mean speed $\bar{V}$ of the fluid by using the following formula:

$\Delta T = Tba - Tab = (\bar{V} \cdot 2L)/c^2$, where c is the speed of an ultrasound wave in water. The speed of an ultrasound wave in water is equal to approximately 1500 meters per second (m/s), and it depends on temperature.

A second type of measurement device 7, sometimes referred to as a "free pipe" device, is shown in FIG. 2. The first transducer 2a and the second transducer 2b are now situated on opposite sides of the duct, outside the duct. The second type of measurement device 7 thus presents the advantage of not being intrusive.

The path of defined length is once more a rectilinear path 8 of length L between the first transducer 2a and the second transducer 2b.

The measurement module 3 then calculates the mean speed $\bar{V}$ of the fluid by using the following formula:

$$\Delta T = Tba - Tab = (\bar{V} \cdot 2L \cos \varphi)/c^2.$$

With the second type of measurement device 7, it is appropriate to have a large value for $\cos \varphi$ and thus an angle $\varphi$ that is very close to 0. It is therefore necessary either to reduce its diameter D of the duct, or else to increase its length L. Reducing the diameter D presents a risk of head loss for the water in the pipe, whereas increasing the length L tends to reduce the signal-to-noise ratio of the measurements as a result of reducing the level of the received ultrasound signal Sr.

A third type of measurement device 9, sometimes referred to as a "U-shape" device, is shown in FIG. 3. The third type of measurement device 9 seeks to solve the above-mentioned drawbacks. The third type of device 9 is a solution that is not very intrusive, making use of reflectors 10 (in this example mirrors angled at 45°) serving to solve the problem of cow.

The path of defined length is a path 11 of U-shape between the first transducer 2a and the second transducer 2b.

It can happen that disturbances P (shown in FIG. 1), e.g. anomalies or attempts at fraud, degrade the operation of the measurement device of a fluid flow meter.

An anomaly is defined herein as being an involuntary phenomenon, e.g. resulting from an operating problem (e.g. in the meter or in the network) or from a fluid flow problem.

An attempt at fraud is defined herein as being a voluntary phenomenon, e.g. performed using an ultrasound generator. An attempt at fraud may be performed from outside the pipe and the duct, but it could also be performed from inside the pipe, e.g. by positioning a waterproof ultrasound generator in a particle filter situated downstream from the meter and close thereto.

OBJECT OF THE INVENTION

An object of the invention is used to make an ultrasonic device for measuring fluid speed more robust against anomalies and attempts at fraud.

SUMMARY OF THE INVENTION

In order to achieve this object, there is provided a method of measuring the speed of a fluid, the method comprising measurement stages, each comprising the following steps:
generating a plurality of pseudorandom emission frequencies;
for each pseudorandom emission frequency, emitting ultrasound measurement signals into the fluid at said pseudorandom emission frequency, which signals travel along a path of defined length;
receiving the ultrasound measurement signals after they have travelled along the path of defined length;
for each received ultrasound measurement signal, producing a travel time measurement representative of the time taken by the received ultrasound measurement signal to travel along the path of defined length, thereby producing, for each pseudorandom emission frequency, a predefined number of travel time measurements;
for each pseudorandom emission frequency, evaluating the accuracy of the travel time measurements produced for said pseudorandom emission frequency;

for evaluating the speed of the fluid, making use of the travel time measurements produced for the pseudorandom emission frequency that presents the greatest accuracy.

By generating a plurality of pseudorandom emission frequencies and by selecting the pseudorandom emission frequency that is the most accurate, it is ensured that the selected pseudorandom emission frequency is sufficiently far removed from a disturbing frequency, if any. This serves to make the fluid speed measurement robust against disturbances.

There is also provided an ultrasound fluid meter comprising a first transducer, a second transducer, and processor means arranged to perform the measurement method as described above.

There is also provided a computer program including instructions for enabling an ultrasound fluid meter to perform the measurement method as described above.

There are also provided storage means that store a computer program including instructions for enabling an ultrasound fluid meter to perform the measurement method as described above.

Other characteristics and advantages of the invention appear on reading the following description of a particular, nonlimiting embodiment of the invention.

BRIEF DESCRIPTION OF THE DRAWINGS

Reference is made to the accompanying drawings, in which:

FIG. 4 shows an ultrasound measurement signal received after it has travelled along a path of defined length;

FIG. 6 is a graph showing travel time measurement points;

DETAILED DESCRIPTION OF THE INVENTION

The method of the invention for measuring a fluid speed is performed in this example in an ultrasonic water meter.

Figure 1:
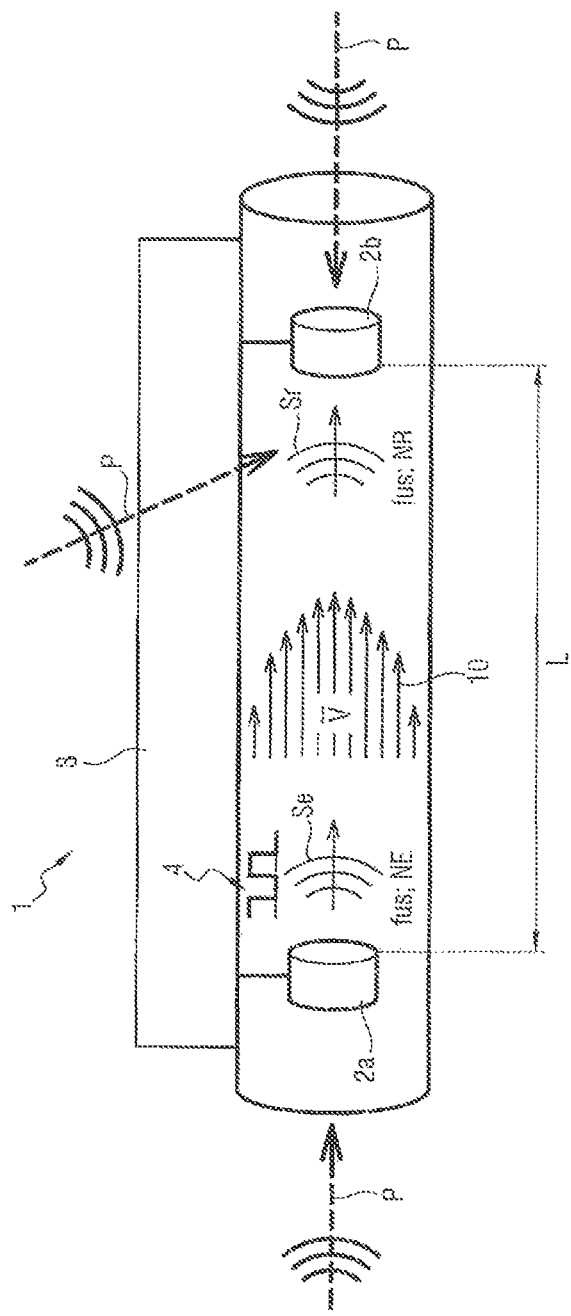
FIG. 1 shows an ultrasonic measuring device of a first type.
Figure 2:
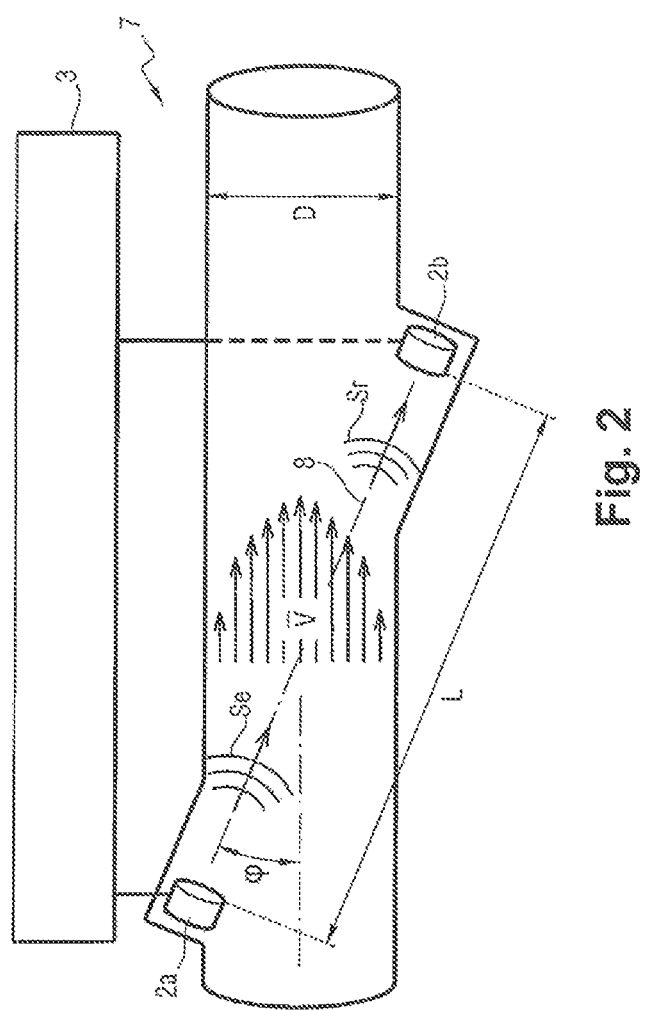
FIG. 2 shows an ultrasonic measuring device of a second type.
Figure 3:
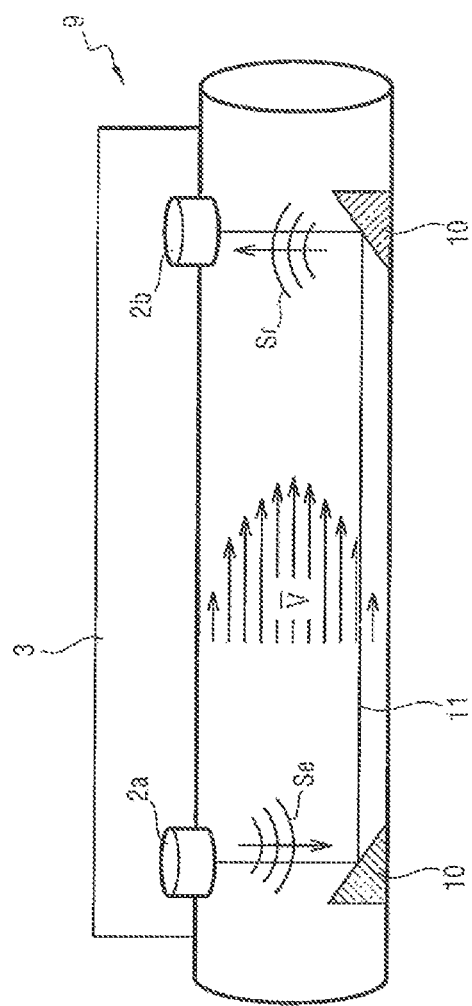
FIG. 3 shows an ultrasonic measuring device of a third type.

The ultrasonic water meter comprises both a duct through which water delivered by a distribution network flows to an installation, and also a water speed measurement device of the kind shown in FIG. 1.

Water flows in the duct from upstream to downstream, as represented by the direction of arrows 10 visible in FIG. 1.

The measurement device comprises a measurement module 3, the first transducer 2a, and the second transducer 2b.

The measurement module 3 comprises processor means including an intelligent processor component adapted to execute instructions of a program for performing the various steps of the measurement method of the invention. In this example, the intelligent component is a microcontroller, but it could be some other component, e.g. a processor or a field programmable gate array (FPGA).

The processor means control the first transducer 2a and the second transducer 2b.

The first transducer 2a and the second transducer 2b are paired. In this example, the first transducer 2a and the second transducer 2b are piezoelectric transducers.

Each of the first and second transducers 2a and 2b performs in succession the function of an ultrasound measurement signal emitter and the function of an ultrasound measurement signal receiver.

The processor means thus provide the emitter with electrical signals that are transformed by the emitter into ultrasound measurement signals. In this example, the electrical signals are squarewave signals 4. The processor means acquire the ultrasound measurement signals Sr received by the receiver.

The emitter emits the ultrasound measurement signals Se at an emission frequency fus. In this example, the frequency fus lies in the range 900 kilohertz (kHz) to 4 megahertz (MHz).

The ultrasound measurement signals Se thus travel from upstream to downstream and from downstream to upstream along a path of defined length L between the first transducer 2a and the second transducer 2b. In this example, the path of defined length is a rectilinear path between the first transducer 2a and the second transducer 2b.

In FIG. 1, the first transducer 2a is shown as performing the function of an emitter, and the second transducer 2b is shown as performing the function of a receiver. The ultrasound measurement signal Se thus follows the path of defined length from upstream to downstream. The ultrasound measurement signal Se is emitted by the emitter at a level NE. The received ultrasound measurement signal Sr is received by the receiver at a level NR that is lower than the level NE.

The description begins with the general principle used for evaluating the speed of the water.

The processor means produce a travel time measurement representative of the time taken by the ultrasound measurement signal Se to travel along the path of predefined length from upstream to downstream, and then produce a travel time measurement representative of the time taken by the ultrasound measurement signal Se to travel along the path of predefined length from downstream to upstream, and finally they evaluate the speed of the water as a function of those travel times.

FIG. 4 shows a received ultrasound measurement signal Sr as received by the receiver after it has travelled along the path of defined length.

The receiver activates reception at a moment T0, synchronized with the emission of the ultrasound measurement signal Se. This synchronization is made possible by pairing the emitter and the receiver.

The travel time is measured on the basis of determining a moment of arrival T1 for a predetermined lobe 12 of the received ultrasound measurement signal Sr.

In this example, the moment of arrival T1 is the instant at which a rising front of the predetermined lobe 12 arrives. The moment of arrival T1 is measured by a zero crossing type method.

The predetermined lobe 12 is a $j^{th}$ lobe of the received ultrasound measurement signal Sr after the received ultrasound measurement signal Sr presents an amplitude that exceeds a predetermined amplitude threshold Sa at a time T2. Specifically, in this example the $j^{th}$ lobe is the fourth lobe.

The speed of the water is then evaluated by the measurement module 3 as a function of an upstream to downstream travel time measurement and of a downstream to upstream travel time measurement.

The speed of the water is proportional to a difference between the downstream to upstream travel time measurement and the upstream to downstream travel time measurement.

It should be observed that in this example, the measured speed of the water is an average speed for the water across the diameter of the duct, given that the speeds of masses of water differ from the center of the duct to the proximity of the walls of the duct.

The measurement method of the invention comprises measurement stages that are repeated at regular intervals.

Figure 5:
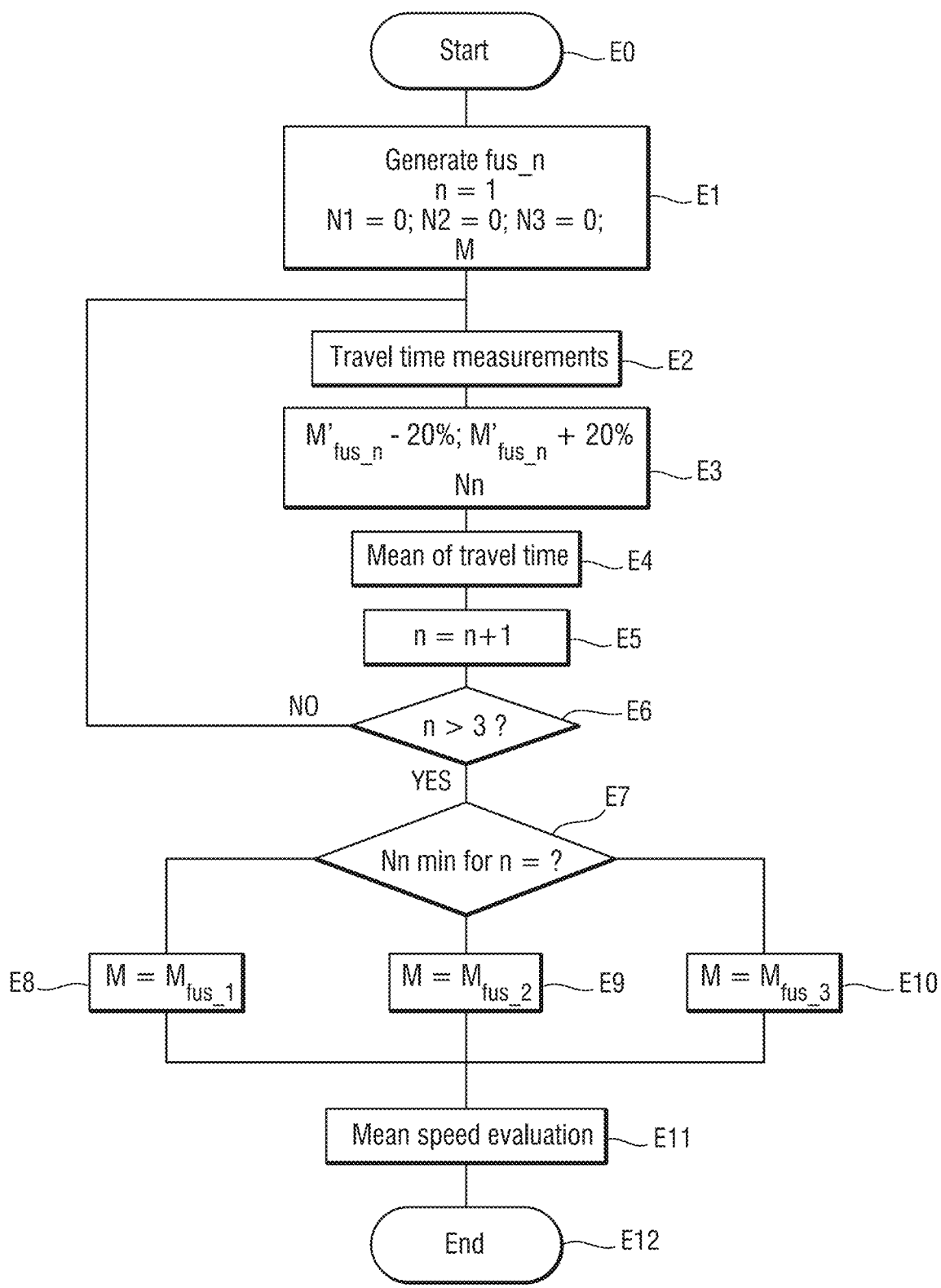
FIG. 5 shows steps in a measurement stage of the measurement method of the invention.

With reference to FIG. 5, there follows a description of the various steps included in a measurement stage.

Following a starting step (step E0), the measurement stage includes a step consisting in generating a plurality of pseudorandom emission frequencies fus_n, for n varying over the range 1 to 3 (step E1). Thus, specifically, three pseudorandom emission frequencies are generated fus_1, fus_2, fus_3.

The three pseudorandom emission frequencies fus_n lie between a minimum frequency fmin and a maximum frequency fmax. In this example, the difference between fmax and fmin is equal to 100 kHz. Furthermore, as mentioned above, the minimum frequency fmin and the maximum frequency fmax themselves lie in the range 900 kHz to 4 MHz.

The three pseudorandom emission frequencies fus_n are generated in this example by using a 32-bit counter for counting the cycles of the microcontroller of the processor means.

In this example, the pseudorandom emission frequencies fus_n are each equal to:

fus_n=fmin+Kn*1 kHz, where Kn is a pseudorandom variable equal to the least significant 7 bits of the counter.

It would be possible to generate the three pseudorandom emission frequencies fus_n in some other way, e.g. by using a generator polynomial. The generator polynomial would then be implemented using a circuit comprising D type bistables. All of the inputs of the D type bistables would be initialized at 0. Seven consecutive bits at the output from the circuit would be used for generating the above-mentioned pseudorandom variables Kn.

An example of a generator polynomial that can advantageously be used is:

$$1+x^{-3}+x^{-11}.$$

The three pseudorandom emission frequencies fus_n are spaced apart from one another by at least a predefined frequency difference. The predefined frequency difference lies in the range 5 kHz to 50 kHz, and in this example it is equal to 10 kHz. The advantage of this predefined frequency difference is explained below. When two pseudorandom emission frequencies fus_n are generated without complying with this predefined frequency difference, then one of the pseudorandom emission frequencies fus_n is ignored and a new pseudorandom emission frequency fus_n is generated.

The three pseudorandom emission frequencies fus_n are thus generated consecutively.

The first pseudorandom emission frequency used is the pseudorandom emission frequency fus_1 (i.e. n=1).

The three variables N1, N2, and N3 are initialized to 0. The variable M is also initialized to 0. The roles of these variables are explained below.

A predefined number of ultrasound measurement signals Se at the pseudorandom emission frequency fus_1 are emitted by the emitter, which is specifically the first transducer 2a. In this example, the predefined number is equal to 80.

The ultrasound measurement signals Se thus follow the path of defined length from upstream to downstream.

The ultrasound measurement signals Se are received by the receiver, which is thus specifically the second transducer 2b. For each received ultrasound measurement signal Sr, a travel time is estimated (specifically the upstream to downstream travel time).

A number of travel time measurements, equal to the predefined number, is then generated by using the above-described method for measuring travel time. 80 travel time measurements are thus generated (step E2).

Thereafter, for the pseudorandom emission frequency fus_1, accuracy is evaluated for the travel time measurements produced using said pseudorandom emission frequency fus_1.

With reference to FIG. 6, evaluation of the accuracy of the travel time measurements consists initially in calculating a mean $M'_{fus\_1}$ of the travel time measurements, and then in determining a number of inaccurate travel time measurements 13 that lie outside a range $[M'_{fus\_1}-X, M'_{fus\_1}+X]$ (step E3).

X is a predetermined percentage of the mean $M'_{fus\_1}$.

The predetermined percentage is the same regardless of the value of the index n.

For each fus_n, X advantageously lies in the range 3% to 30% of $M'_{fus\_n}$. In this example, X is equal to 20% of $M'_{fus\_n}$.

In FIG. 6, it can be seen that four inaccurate travel time measurements lie outside the range $[M'_{fus\_1}-20\%, M'_{fus\_1}+20]\%$.

The number N1, which corresponds to the number of inaccurate travel time measurements 13 for the pseudorandom emission frequency fus_1, thus takes the value 4.

Thereafter, the inaccurate travel time measurements 13 are eliminated and $M_{fus\_1}$ is calculated, which is the mean of the travel time measurements within the range $[M'_{fus\_1}-20\%, M'_{fus\_1}+20\%]$ (step E4).

Thereafter, the index n is incremented: n=n+1 (step E5). The value taken by n is thus n=2.

There follows a step of comparing the value of n with 3 (step E6). So long as n is less than or equal to 3, steps E2 to E5 are repeated.

The steps E2 to E5 are thus performed with the pseudorandom emission frequency fus_2, and then with the pseudorandom emission frequency fus_3.

This produces the values $M'_{fus\_2}$, N2, and $M_{fus\_2}$, and then the values $M'_{fus\_3}$, N3, and $M_{fus\_3}$.

When n becomes greater than 3, step E7 follows step E6. During step E7, the value of k is determined for which the number Nk has its minimum value. In other words, the pseudorandom emission frequency fus_k is determined that is associated with the smallest number of inaccurate travel time measurements 13, and thus the pseudorandom emission frequency fus_k that presents the greatest accuracy.

If k is equal to 1, then $M=M_{fus\_1}$ (step E8).
If k is equal to 2, then $M=M_{fus\_2}$ (step E9).
If k is equal to 3, then $M=M_{fus\_3}$ (step E10).

The value M is then equal to the mean $M_{fus\_k}$ of the travel time measurements within the range $[M'_{fus\_k}-20\%, M'_{fus\_k}+20\%]$, where fus_k is the emission frequency that presents the greatest accuracy.

The above-described steps are performed again, this time using the second transducer 2b as the emitter and the first transducer 2a as the receiver. The estimated travel time is then an upstream to downstream travel time.

The mean speed of the water is then evaluated by using the value M as the mean travel time for evaluating the speed of the water from upstream to downstream and from downstream to upstream (step E11). Temperature compensation may be performed, since the speed of sound in water depends on temperature.

The measurement stage then comes to an end (step E12).

The measurement method of the invention is thus robust against disturbances that might degrade the operation of the measurement device, i.e. both against involuntary anomalies and against voluntary attempts at fraud.

When an anomaly occurs or when the anomaly leads to interference in one of the pseudorandom emission frequencies fus_n, that pseudorandom emission frequency fus_n is associated with poor accuracy, and the measurement method uses some other pseudorandom emission frequency fus_n to estimate the speed of the water. By way of example, such an anomaly may be the result of turbulence in the water and of the presence of bubbles of air generated by the turbulence.

Likewise, if an ultrasound signal is emitted by an ultrasound generator for fraudulent purposes, the measurement method makes use of a pseudorandom emission frequency fus_n different from the frequency used by that ultrasound generator.

It should be observed that using the predefined frequency difference between two pseudorandom emission frequencies serves to ensure that the pseudorandom emission frequencies are far apart from one another. Thus, if one of the pseudorandom emission frequencies is disturbed, the others are not.

It should also be observed that, since the emission frequencies are pseudorandom, two water meters making use of the measurement method of the invention do not disturb each other. Specifically, the two meters never emit simultaneously at the same frequencies, and they are not synchronized.

In addition to measurement stages, the measurement method of the invention includes detection stages that serve to detect the occurrence of a disturbance and to determine whether the disturbance comes from an anomaly or from an attempted fraud.

Each detection stage is repeated at regular intervals, which may optionally be periodic, between two measurement stages. A detection stage consists in making the above-mentioned predetermined amplitude threshold Sa programmable in order to detect the presence of a disturbance.

The programmable predetermined amplitude threshold is thus a detection threshold $S\_n$ that can take on a plurality of predefined values lying between a maximum detection threshold $S\_0$ and a minimum detection threshold $S\_N-1$. Each of the predefined values of the detection threshold $S\_n$ is referenced by the index $\underline{n}$ and presents values that decrease with increasing index n.

Figure 7:
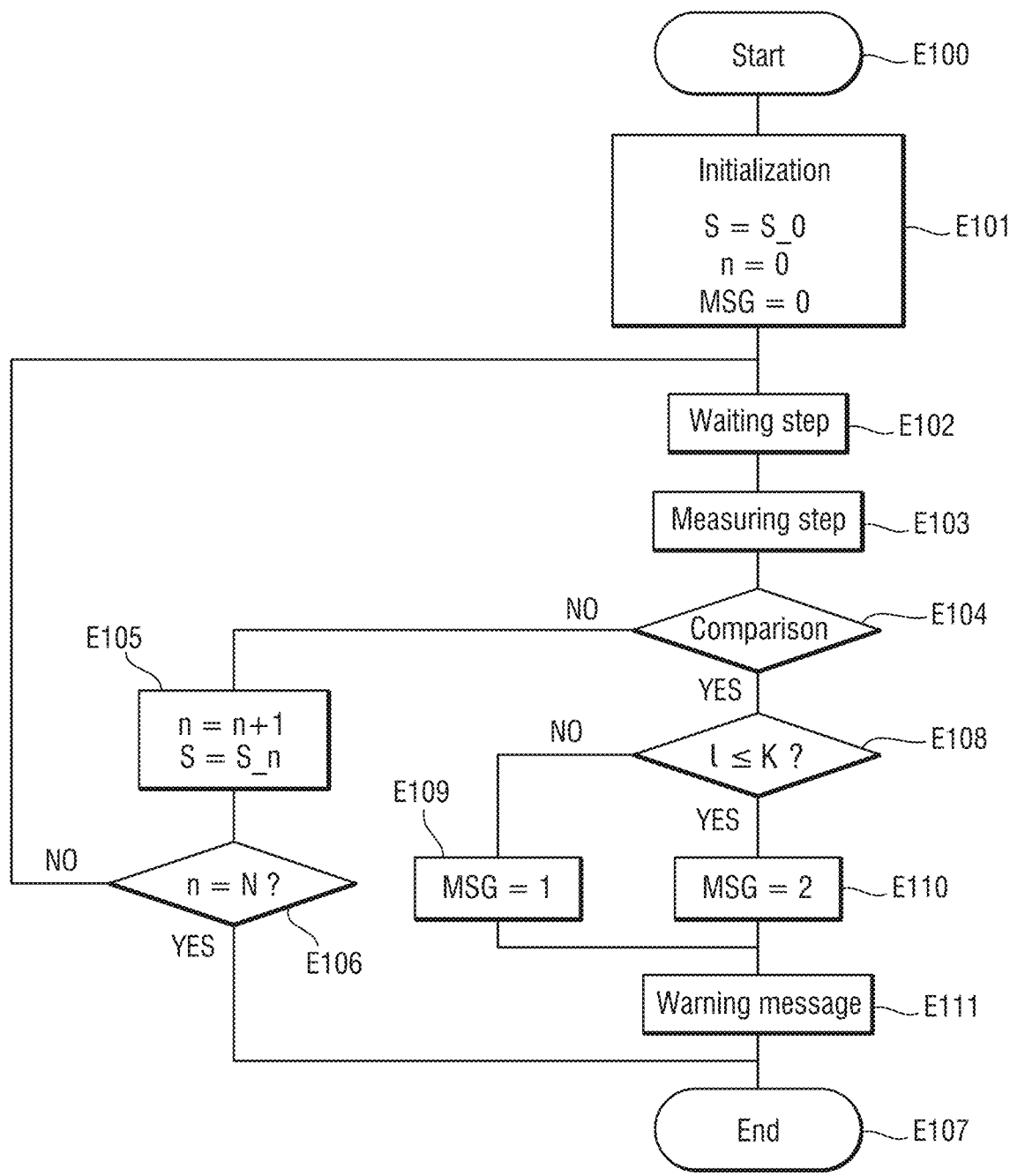
FIG. 7 shows steps of a detection stage of the measurement method of the invention.

With reference to FIG. 7, there follows a description in greater detail of the various steps constituting a detection stage.

Following a starting step (step E100), the detection stage comprises an initialization step (step E101) consisting in initializing the index $\underline{n}$ to 0, the current value of the detection threshold $S\_n$ to the maximum detection threshold $S\_0$, and a variable MSG to 0. The role of the variable MSG is explained below.

Thereafter, the detection stage comprises a waiting step (step E102) and a measuring step (step E103).

The waiting step is for delaying implementation of the measurement step by a delay time.

The delay time is measured on the basis of a moment when the level of the ultrasound measurement signal generated during a preceding measurement stage has become lower than a predetermined silence threshold.

In this example, the delay time is equal to 15 milliseconds (ms).

The level of the ultrasound measurement signal generated during the preceding measurement stage is measured both by the first transducer 2a acting as a receiver and by the second transducer 2b acting as a receiver.

Thus, after the delay time, the level of the measured ultrasound signal as generated voluntarily during the preceding measurement stage is almost zero.

Thereafter, the detection stage comprises a step during which the first transducer 2a (or indeed the second transducer 2b) acts as a receiver (E103).

The receiver acquires the level of the ultrasound signal present in the water while no ultrasound measurement signal is being generated. The processor means then measure this "interfering" sound signal present in the water, and compare the level of the interfering ultrasound signal with the current value of the detection threshold $S\_n$ (step E104). At this moment, the current value of the detection threshold is equal to $S\_0$.

If the level of the interfering ultrasound signal is less than the current value of the detection threshold $S\_n$, then the presence of disturbance is not detected.

The index $\underline{n}$ is incremented: the index $\underline{n}$ becomes equal to 1, and the current value of the detection threshold becomes equal to S1 (step E105).

The index $\underline{n}$ is then compared with the value N (step E106).

If $\underline{n}$ reaches the value N, then the detection stage comes to an end without any disturbance being detected (step E107). Otherwise, the detection stage goes back to step E102.

In contrast, during the step E104, when the level of the measured interfering ultrasound signal becomes greater than or equal to a limit current value of the detection threshold $S\_l$, then a disturbance is detected.

The index $\underline{l}$ of the current limit value of the detection threshold $S\_l$ is then compared with a predefined index threshold K (E108).

If the index $\underline{l}$ of the current limit value of the detection threshold $S\_l$ is greater than the predefined index threshold K, that means that the current limit value of the detection threshold $S\_l$ is relatively small and thus that the level of the interfering ultrasound signal is relatively low. It is deduced therefrom that the disturbance corresponds to an anomaly.

The variable MSG then takes the value 1 (step E109).

In contrast, if the index $\underline{l}$ of the current limit value of the detection threshold $S\_l$ is less than or equal to the predefined index threshold K, that means that the current limit value of the detection threshold $S\_l$ is large and thus that the level of the interfering ultrasound signal is $\underline{high}$. It is deduced therefrom that the disturbance corresponds to an attempted fraud.

The variable MSG then takes the value 2 (step E110).

Thereafter, the detection stage has a step of transmitting a warning message that depends on the value of the variable MSG (step E111). If the variable MSG is equal to 1, the warning message is an anomaly message, and if the variable MSG is equal to 2, the message is a fraud message.

The warning message is transferred to an "entity", which may for example be a water supplier, a water network manager, any operator, or a water-consuming client.

The warning message is transmitted by powerline carrier or by any other (wired or wireless) type of communication means. When powerline carrier communication is selected, the DLMS and COSEM application layers are advantageously used.

Under such circumstances, an example warning message may be as follows:

```
<EventNotificationRequest>
    <AttributeDescriptor>
        <ClassIdValue="0001" />
        <InstanceIdValue="0000616200FF" />
        <AttributeIdValue="02" />
    </AttributeDescriptor>
    <AttributeValue>
        <DoubleLongUnsignedValue="00000001" />
    </AttributeValue>
</EventNotificationRequest>
```

The encoding associated with the corresponding alarm is: C20000010000616200FF020600000001.

During the detection stage, provision may be made to emit a decoy ultrasound signal, and to attempt to detect a fraudulent ultrasound signal emitted in response to the decoy ultrasound signal. Specifically, there exist very sophisticated ultrasound generators that are capable of being used for fraudulent purposes, that attempt to become synchronized on ultrasound measurement signal emissions in order to disturb them.

In order to counter fraud of that type, a decoy signal is emitted for a short duration, and then once the decoy signal has faded, a check is made to see whether an ultrasound signal is present. Such an ultrasound signal is then a fraudulent ultrasound signal. A warning message (of type MSG=2) is then issued.

It should be observed that it is possible to make provision for adjusting the predefined index threshold K, that serves to distinguish between an anomaly and an attempted fraud. By way of example, the adjustment may depend on the time of day at which the detection stage is performed. It is known that at the end of the day, the water distribution network is heavily used, thereby tending to increase the occurrence of anomalies and the level of interfering ultrasound signals that result from such anomalies. It can therefore be advantageous to lower the predefined index threshold K at the end of the day.

The predefined values $S\_0, \ldots,$ and $S\_N-1$ that can be taken by the detection threshold $S\_n$ can thus be adjustable.

It should also be observed that the entire detection phase need not necessarily be performed in the water meter.

By way of example, it is entirely possible to make provision for measurements of the level of interfering ultrasound signal to be taken in the water meter, and for those measurements to be transmitted to external equipment, e.g. a "cloud" server managed by an entity. For each detection stage, the steps following the measurement step are then performed in the external equipment. The entity may then make use of its own criteria for detecting and evaluating the disturbance. By way of example, the entity may itself define the predefined index threshold K for distinguishing between an anomaly and an attempted fraud.

Naturally, the invention is not limited to the embodiment described, but covers any variant coming within the ambit of the invention as defined by the claims.

The invention is naturally not limited to measuring the speed of water, but applies to any type of fluid (e.g. a gas or oil).

The invention is described above in an ultrasonic water meter comprising a first type of measurement device (classical pipe), however the invention can be performed in any other type of ultrasonic measurement device, and in particular with the second type of measurement device and with the third type of measurement device as described above. It is possible to use any type of path of defined length, with any type of reflector, any type of mirror, etc.

It is stated that each detection stage is performed between two measurement stages. Those measurement stages need not necessarily be successive measurement stages. In general manner, the measurement stages and the detection stages may be repeated, optionally regularly, optionally periodically.

All of the numerical values provided herein are used to illustrate the invention, and they could naturally be different when performing the invention.

The invention claimed is:

1. A method of measuring the speed of a fluid, the method comprising:
    measurement stages, each comprising the following steps:
        generating a plurality of pseudorandom emission frequencies (fus_n);
        for each pseudorandom emission frequency (fus_n), producing travel time measurements representative of times taken by ultrasound measurement signals emitted at said pseudorandom emission frequency to travel along a path of defined length;
        for each pseudorandom emission frequency (fus_n), evaluating the accuracy of the travel time measurements; and
        for evaluating the speed of the fluid, making use of the travel time measurements produced for the pseudorandom emission frequency (fus_k) that presents the greatest accuracy;
    and
    detection stages, each performed between two measurement stages, each detection stage comprising the following steps:
        measuring an interfering ultrasound signal level present in the fluid;
        comparing the interfering ultrasound signal level with a current value of a detection threshold, the detection threshold being capable of taking a plurality of predefined values lying between a maximum detection threshold and a minimum detection threshold;
        if the measured interfering ultrasound signal level is less than the current value of the detection threshold, reducing the current value of the detection threshold, and reiterating the measurement step and the comparison step; and
        when the measured interfering ultrasound signal level becomes greater than or equal to a limit current value of the detection threshold, detecting a disturbance and, as a function of the limit current value of the detection threshold, determining whether the disturbance comes from an anomaly or from an attempted fraud.

2. The measurement method according to claim 1, wherein each of the the measurement stages further comprising, for each pseudorandom emission frequency (fus_n), evaluating the accuracy of the travel time measurements comprises a step of calculating a mean $M'_{fus\_n}$ of the travel time measurements, and a step of determining a number of inaccurate travel time measurements lying outside a range $[M'_{fus\_n}-X, M'_{fus\_n}+X]$, the emission frequency that presents the greatest accuracy being the frequency for which the number of inaccurate travel time measurements is the lowest, wherein for a received ultrasound measurement signal, the travel time measurement is obtained on the basis of determining a moment of arrival for a predetermined lobe of the received ultrasound measurement signal.

3. The measurement method according to claim 2, wherein X lies in the range 3% to 30% of $M'_{fus\_n}$.

4. The measurement method according to claim 2, wherein a mean travel time used for evaluating the speed of the fluid is equal to the mean $M_{fus\_k}$ of the travel time measurements within the range $[M'_{fus\_k}-X, M'_{fus\_k}+X]$, fus_k being the emission frequency that presents the greatest accuracy.

5. The measurement method according to claim 2, wherein the moment of arrival is the instant at which a rising front of the predetermined lobe arrives.

6. The measurement method according to claim 2, wherein the predetermined lobe is a $j^{th}$ lobe of the received ultrasound measurement signal after the received ultrasound measurement signal presents an amplitude that exceeds a predetermined amplitude threshold.

7. The measurement method according to claim 1, wherein the plurality of pseudorandom emission frequencies (fus_n) are generated by making use of a cycle counter of a microcontroller.

8. The measurement method according to claim 1, wherein the plurality of pseudorandom emission frequencies (fus_n) are generated by making use of a generator polynomial.

9. The measurement method according to claim 1, wherein the pseudorandom emission frequencies (fus_n) lie in the range 900 kHz to 4 MHz.

10. The measurement method according to claim 1, wherein the pseudorandom emission frequencies (fus_n) are spaced apart from one another by at least a predefined frequency difference.

11. The measurement method according to claim 10, wherein the predefined frequency difference lies in the range 5 kHz to 50 kHz.

12. The measurement method according to claim 1, wherein each of the predefined values of the detection threshold is referenced by an index presenting values that decrease with increasing index, and wherein a disturbance is determined as coming from an anomaly if the index of the limit current value of the detection threshold is greater than a predefined index threshold, and a disturbance is determined as coming from an attempted fraud if the index of the limit current value of the detection threshold is less than or equal to the predefined index threshold.

13. The measurement method according to claim 12, wherein the predefined index threshold is adjustable.

14. The measurement method according to claim 13, wherein the predefined index threshold is adjustable as a function of the time of day at which the detection stage is performed.

15. The measurement method according to claim 1, wherein the detection stage also includes a waiting step for delaying performance of the measurement step by a predefined delay time.

16. The measurement method according to claim 15, wherein the predefined delay time is measured on the basis of a moment when the level of the ultrasound measurement signal generated during a preceding measurement stage has become lower than a predetermined silence threshold.

17. The measurement method according to claim 1, wherein the detection stage also includes steps of emitting a decoy ultrasound signal, and of attempting to detect a fraudulent ultrasound signal emitted in response to the decoy ultrasound signal.

18. The measurement method according to claim 1, wherein the detection stage also includes the step of transmitting the measured level of the interfering ultrasound signal to external equipment.

19. The measurement method according to claim 18, wherein the measurement stages and the measurement step in each detection stage are performed in an ultrasound fluid meter, and wherein the steps following the measurement step of each detection stage are performed in the external equipment.

20. The measurement method according to claim 18, wherein the external equipment is a server in the "cloud".

21. The measurement method according to claim 1, wherein the detection stage also includes the step of transmitting a warning message when a disturbance is detected.

22. The measurement method according to claim 21, wherein the warning message is transmitted by powerline carrier.

23. An ultrasound fluid meter comprising a first transducer, a second transducer, and processor means arranged to perform the measurement method according to claim 1.

24. A computer program including instructions for enabling an ultrasound fluid meter to perform the measurement method according to claim 1.

25. Storage means wherein they store a computer program including instructions for enabling an ultrasound fluid meter to perform the measurement method according to claim 1.

26. A method of measuring the speed of a fluid, the method comprising measurement stages, each comprising the following steps:

generating a plurality of pseudorandom emission frequencies (fus_n);

for each pseudorandom emission frequency (fus_n), producing travel time measurements representative of times taken by ultrasound measurement signals emitted at said pseudorandom emission frequency to travel along a path of defined length;

for each pseudorandom emission frequency (fus_n), evaluating the accuracy of the travel time measurements;

for evaluating the speed of the fluid, making use of the travel time measurements produced for the pseudorandom emission frequency (fus_k) that presents the greatest accuracy;

the measurement method being such that, for each pseudorandom emission frequency (fus_n), evaluating the accuracy of the travel time measurements comprises a step of calculating a mean M'fus_n of the travel time measurements, and a step of determining a number of inaccurate travel time measurements lying outside a range $[M'_{fus\_n}-X, M'_{fus\_n}+X]$, the emission frequency that presents the greatest accuracy being the frequency for which the number of inaccurate travel time measurements is the lowest, wherein the measurement method further comprises detection stages, each performed between two measurement stages, each detection stage comprising the following steps:

measuring an interfering ultrasound signal level present in the fluid;

comparing the interfering ultrasound signal level with a current value of a detection threshold, the detection threshold being capable of taking a plurality of predefined values lying between a maximum detection threshold and a minimum detection threshold;

if the measured interfering ultrasound signal level is less than the current value of the detection threshold, reducing the current value of the detection threshold, and reiterating the measurement step and the comparison step;

when the measured interfering ultrasound signal level becomes greater than or equal to a limit current value of the detection threshold, detecting a disturbance and, as a function of the limit current value of the detection threshold, determining whether the disturbance comes from an anomaly or from an attempted fraud.

* * * * *